United States Patent

[11] 3,622,613

[72] Inventors Robert C. Kuder
Excelsior, Minn.;
Marwan R. Kamal, Dhahran, Saudi Arabia
[21] Appl. No. 819,438
[22] Filed Apr. 25, 1969
[45] Patented Nov. 23, 1971
[73] Assignee General Mills, Inc.

[54] CARBONATE ESTERS OF HYDROXY SUBSTITUTED FATTY NITRILES
8 Claims, No Drawings
[52] U.S. Cl. .................................................. 260/463,
260/18 TN, 260/67 TN, 260/75 NT, 260/77.5 AP,
260/77.5 AT, 117/161
[51] Int. Cl. ....................................................C07c 121/34,
C07c 119/04, C08g 22/18
[50] Field of Search............................................ 260/463

[56] References Cited
UNITED STATES PATENTS
2,265,814 12/1941 Ritchie et al................... 260/465.9
Primary Examiner—James O. Thomas, Jr.
Assistant Examiner—Diana G. Rivers
Attorneys—Anthony A. Juettner, William C. Babcock and Gene O. Enockson ABSTRACT: Carbonate dinitriles of the formula:

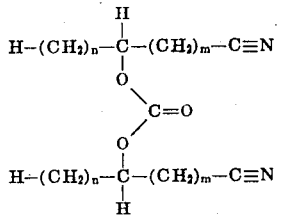

where $n$ is 5 to 20, $m$ is 0 to 15 and the sum of $n$ and $m$ is 14 to 20. Diamines and diisocyanates derived therefrom with the latter being useful for preparing polymers.

CARBONATE ESTERS OF HYDROXY SUBSTITUTED FATTY NITRILES

The present invention relates to new carbonate dinitriles. More particularly, it relates to such carbonate dinitriles prepared from certain fatty compounds and phosgene.

The new carbonate dinitriles of the present invention have the structural formula:

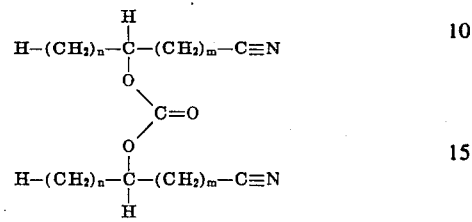

where $n$ is 5 to 20, $m$ is 0 to 15, and the sum of $n$ and $m$ is 14 to 20. It is preferred that the sum of the whole integers $n$ and $m$ is 16. Our new carbonate dinitriles are useful as intermediates (via the nitrile groups) in the preparation of diacids, diesters, diamines, and the like. The diamines, for example, are useful for preparing diisocyanates which in turn can be reacted with a variety of organic compounds containing two or more active hydrogen to yield polymers having utility as coatings, moldings and the like.

The carbonate dinitriles of our invention can be prepared by the reaction of phosgene with a hydroxy substituted fatty nitrile. The starting hydroxy substituted fatty nitriles can be prepared in a number of ways. One procedure is that set forth in VanderWal U.S. Pat. No. 2,558,666 which shows the preparation of mixtures of such starting materials by the reaction of sulfuric acid under moderately low temperatures with unsaturated nitriles to form sulfates (sulfuric esters) which sulfates are then hydrolyzed to form the hydroxy substituted fatty nitriles.

The preparation of mononitriles from fatty acids and ammonia is well known. This preparation and the conditions useful in same are set forth in "Fatty Acids And Their Derivatives" by A. W. Ralston, 1948, pp. 620–625 (John Wiley & Sons, Inc. The useful monoethylenically unsaturated aliphatic monobasic carboxylic acids which can be converted to the mononitriles and then to the starting hydroxy substituted mononitriles can be represented by the following: 9-hexadecenoic (palmitoleic), 7-hexadecenoic, 2-hexadecenoic, 2-heptadecenoic, 2-octadecenoic, 3-octadecenoic, 4-octadecenoic, 5-octadecenoic 6-octadecenoic (petroselinic), 7-octadecenoic, 8-octadecenoic, 9-octadecenoic (oleic, elaidic), 10-octadecenoic, 11-octadecenoic (vaccenic), 12-octadecenoic, 2-nonadecenoic, 9-eicosenoic (gadoleic), 11-eicosenoic, 13-docosenoic (erucic), 11-docosenoic (cetoleic) and the like.

The described hydroxy substituted fatty nitriles are then reacted with phosgene to produce the new carbonate dinitriles of the present invention. Such phosgenation can be carried out by dissolving the hydroxy substituted fatty nitriles in an organic solvent such as toluene, benzene, pyridine (also an acid acceptor) and the like or mixtures thereof followed by the slow addition of phosgene gas, preferably at temperatures below about 25° C.—i.e. 0° to 25° C.

The following examples are illustrative of the invention without being limiting.

EXAMPLE I

To a solution of approximately equal parts of 9-hydroxystearonitrile and 10-hydroxystearonitrile in 600 g. dry toluene and 240 g. dry pyridine was added 124 g. phosgene gas over a period of three hours while maintaining the temperature at 15°-20° C. The reaction mixture was allowed to warm to 25° C. over a period of 1 hour and then diluted with water. The resulting top layer was separated, washed free of pyridine and HCl, and stripped free of toluene on a rotary evaporator, leaving 608 g. crude carbonate dinitrile. The crude product was filtered to remove a small amount of white solid and then further stripped in a falling-film molecular still to remove a small amount of unreacted hydroxystearonitrile. The resulting product contained 4.72 percent nitrogen (theoretical is 4.7 percent) and comprised a mixture of position isomers having the formulas

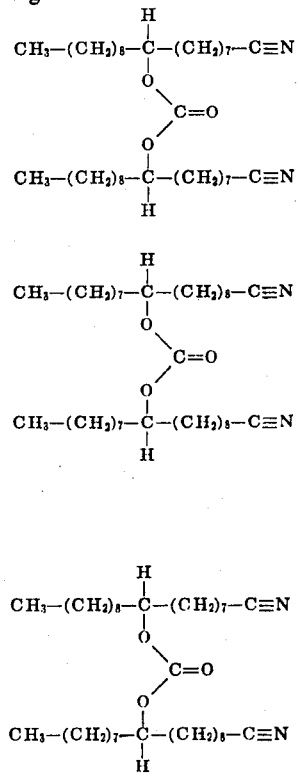

and

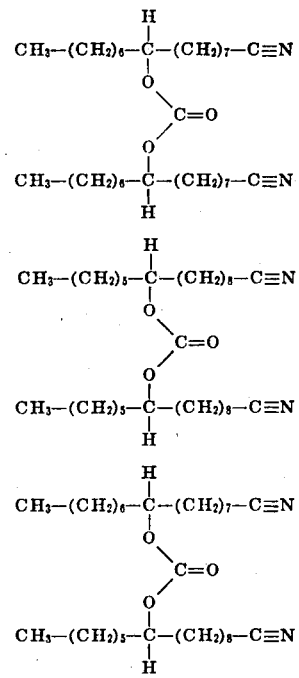

Such mixture of position isomers can be separated (as well as the isomers of the examples to follow) such as by chromatography. However, there is ordinarily no reason to do so since the compounds are functionally equivalent.

EXAMPLE II

Example I is essentially repeated using the mixture of 9- and 10-hydroxy substituted mononitriles obtained from palmitoleic acid. The resulting carbonate dinitriles have the formulas

EXAMPLE III

Example I is essentially repeated using the mixture of 11- and 12-hydroxy substituted mononitriles obtained from vaccenic acid. The resulting dinitriles have the formulas

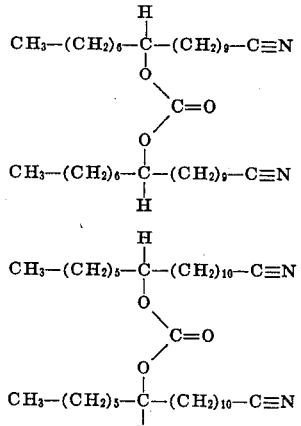

and

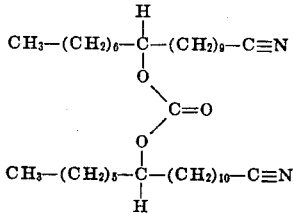

As indicated above, our new dinitriles are particularly useful for preparing diamines and then diisocyanates. The diisocyanates find use in the preparation of polymers by reaction with organic compounds containing active hydrogens.

The dinitriles are converted to the diamines by hydrogenation. The hydrogenation is carried out in the presence of ammonia utilizing a hydrogenation catalyst such as Raney cobalt or Raney nickel. The diamines are then converted to the diisocyanates by the conventional procedure of reacting phosgene therewith and then decomposing the intermediate carbamyl chlorides by raising the reaction temperature. The reaction is preferably carried out in an organic solvent such as toluene or xylene.

The utility of our new dinitriles is accordingly illustrated by the following description.

The following examples are illustrative of the preparation of the diamines without being limiting.

EXAMPLE A

A mixture of 107 g. of the carbonate dinitrile as prepared in Example I, 107 g. methanol, 16.2 g. Raney active cobalt catalyst and 80 ml. liquid ammonia was heated in a stirred autoclave for 3.75 hours at 145°–50° C. under hydrogen at 1,980–2,460 p.s.i. The reaction mixture was then cooled to room temperature, filtered and stripped free of solvent in a rotary evaporator. The resulting crude product (103 g.) was a light brown solid melting over the range of 42°–62° C. This product was purified by distillation through a falling-film molecular still to give a light yellow solid melting at 54°–69° C., with an amine number of 189 (theoretical amine number 188). The product comprised a mixture of position isomers having the formulas

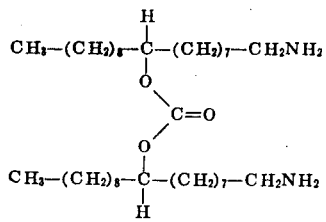

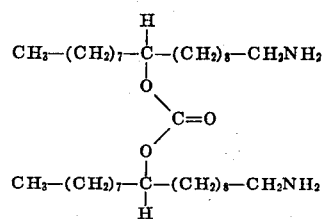

and

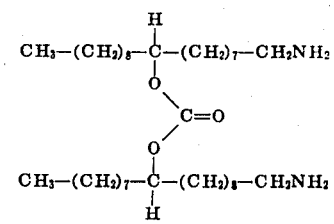

EXAMPLE B

Example A is essentially repeated using the mixture of dinitriles of example II. The resulting carbonate diamines have the same formulas as the dinitriles except that the —C N groups are replaced by —CH$_2$NH$_2$ groups.

EXAMPLE C

Example A is essentially repeated using the mixture of dinitriles of example III. The resulting carbonate diamines have the same formulas as the dinitriles except the —C N groups are replaced by —CH$_2$NH$_2$ groups.

The following examples are illustrative of the preparation of the diisocyanates without being limiting.

EXAMPLE D

To a solution of 205 g. phosgene in 700 ml. dry xylene at 18° C. was added a solution of 188 g. carbonate diamine as prepared in example A in 300 ml. dry xylene over a period of 20 minutes. During this time, the reaction temperature increased to 30° C. and a precipitate (presumably the amine hydrochloride) formed in the reaction mixture. The temperature was increased to 112° C. in 3 ½ hours. More phosgene was then bubbled through the reaction mixture while the temperature was increased over an hour to 130° C., at which point the mixture became clear. The phosgene flow was then replaced by nitrogen and the xylene distilled off to a pot temperature of 200° C. at atmospheric pressure. The residue was held at 200° C. for an hour under full vacuum of a water aspirator. The resulting dark brown crude product was distilled through a falling-film molecular still at a jacket temperature of 260° C. to give a light yellow liquid product partially crystalline at room temperature. Analysis and infrared spectrum showed that the product had a nitrogen content of 4.28 percent (theoretical 4.32 percent), an NCO content of 11.72 percent (theoretical 12.99 percent) and absorption maxima at 4.42$\mu$ $\mu$(NCO), 5.77$\mu$ (carbonate C=O) and 7.9$\mu$ (carbonate C—O). It comprised a mixture of position isomers of the formulas

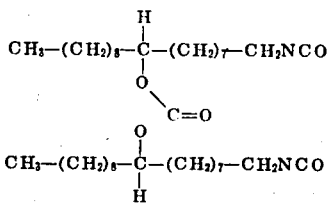

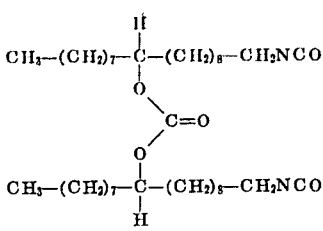

and

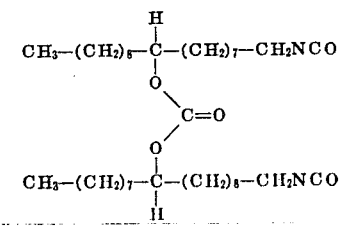

EXAMPLE E

Example D is essentially repeated using the mixture of diamines of example B. The resulting carbonate diisocyanates have the same formulas as the diamines except that the —CH$_2$NH$_2$ groups are replaced by —CH$_2$NCO groups.

EXAMPLE F

Example D is essentially repeated using the mixture of diamines of example C. The resulting carbonate diisocyanates have the same formulas as the diamines except that the —CH$_2$NH$_2$ groups are replaced by —CH$_2$NCO groups.

As indicated above the diisocyanates are particularly valuable for the preparation of polymers by reaction with compounds bearing at least two active hydrogen atoms as determined by the Zerewitinoff method. The Zerewitinoff test is described by Kohler in J. Am. Chem. Soc., 49, 3181 (1927). Such polymers are useful especially as coatings for a variety of substrates.

In general, the active hydrogen atoms of compounds reactive with the diisocyanates are attached to carbon, oxygen, nitrogen or sulfur atoms. Compounds containing the following groups will have active hydrogen atoms: primary amino, secondary amino, carboxyl, diazoamino, hydrazino, hydrazo, hydrazono, hydroxyamino, hydroxyl imido, imino, and mercapto. Most often these active hydrogen atoms are attached to oxygen, nitrogen, or sulfur atoms; thus they will be a part of groups such as —OH, —SH, —NH—, —NH$_2$, —CO$_2$H, —CONH$_2$, —CONHR where R represents an organic radical, —SO$_2$OH, —SO$_2$NH$_2$, and —CSNH$_2$. Examples of suitable types of compounds include water, hydrogen sulfide, ammonia, hydroxyl polyesters, polyhydric polyalkylene ethers, polyhydric polythioethers, polyacetals, aliphatic polyols, including alkane, alkene and alkyne diols, triols, tetrols and the like, aliphatic thiols including alkane, alkene and alkyne thios having two or more —SH groups; polyamines including both aromatic, aliphatic and heterocyclic diamines, triamines, tetramines and the like; as well as mixtures thereof. Of course, compounds which contain two or more different groups within the above-defined classes may also be used such as, for example, amino alcohols which contain an amino group and a hydroxyl group, amino alcohols which contain two amino groups and one hydroxyl group, aminoacids and the like. Further illustrative classes and specific organic compounds containing active hydrogen atoms useful for preparing polymers are described immediately hereinbelow.

Any suitable polyester may be used and may contain terminal hydroxyl groups, terminal carboxylic acid groups, amino groups or the like. Moreover, the polyester may be a polyester amide which was prepared by condensing an amino alcohol containing both free amino groups and free hydroxyl groups with the other components used in the preparation of polyesters. The polyester may be prepared by reacting a polycarboxylic acid or hydroxy carboxylic acid with polyhydric alcohols. It is also possible to use a mixture of polyhydric alcohols and polyamines such as ethylenediamine, polyethylenediamine, 1,4-butylenediamine and the like. Amines such as bis-(2-aminoethyl) ether or amino carboxylic acids such as glycine, alanine, valine, phenylalanine, hydroxyproline and the like may also be used. The polyesters may contain hetero atoms in addition to the ester groups including oxygen, sulfur, nitrogen and the like in the chain. Moreover, the radicals making up the polyester may be either saturated or unsaturated and may contain double or triple bonds as well as modifying radicals of saturated or unsaturated fatty acids such as oleic acid or fatty alcohols such as oleyl alcohol and the like.

Any suitable polycarboxylic acid may be used in the preparation of the polyesters such as, for example, oxalic acid, malonic acid, succinic acid, glutaric acid, adipic acid, pimelic acid, suberic acid, azelaic acid, sebacic acid, brassylic acid, maleic acid, fumaric acid, glutaconic acid, alpha-hydromuconic acid, beta-hydromuconic acid, alpha-butyl-alpha-ethyl-glutaric acid, alpha,beta-diethyl-succinic acid, isophthalic acid, terephthalic acid, hemimellitic acid, trimellitic acid, trimesic acid, mellophanic acid, prehnitic acid, pyromellitic acid, benzenepentacarboxylic acid, 1,4-cyclohexanedicarboxylic acid, and the like. Any suitable polyhydric alcohol may be used in the preparation of the polyesters such as, for example, ethylene glycol, 1,3-propylene glycol, 1,2-propylene glycol, 1,4-butylene glycol, 1,3-butylene glycol, 1,2-butylene glycol, 1,5-pentanediol, 1,4-pentanediol, 1,3-pentanediol, 1,6-hexanediol, 1,7-heptanediol, glycerine, trimethylolpropane, 1,3,6-hexanetriol, triethanolamine, pentaerythritol, sorbitol and the like.

Any suitable polyhydric polyalkylene ether may be used as the active hydrogen containing compound such as, for example, the condensation product of an alkylene oxide or of an alkylene oxide with a polyhydric alcohol. Any suitable polyhydric alcohol may be used such as those disclosed above for use in the preparation of the hydroxyl polyesters. Any suitable alkylene oxide may be used such as, for example, ethylene oxide, propylene oxide, butylene oxide, amylene oxide, and the like. Of course, the polyhydric polyalkylene ethers can be prepared from other starting materials such as, for example, tetrahydrofuran, epihalohydrins such as, for example, epichlorohydrin and the like as well as arlkylene oxides such as, for example, styrene oxide and the like. The polyhydric polyalkylene ethers may have either primary or secondary hydroxyl groups and preferably are polyhydric polyalkylene ethers prepared from alkylene oxides having from two to five carbon atoms such as, for example, polyethylene ether glycols, polypropylene ether glycols, polybutylene ether glycols and the like. It is often advantageous to employ some trihydric or higher polyhydric alcohols such as glycerine, trimethylolpropane, pentaerythritol and the like in the preparation of the polyhydric polyalkylene ethers so that some branching exists in the product. Generally speaking, it is advantageous to condense from about 5 to about 30 moles of alkylene oxide per functional group of the trihydric or higher polyhydric alcohol. The polyhydric polyalkylene ethers may be prepared by any known process such as, for example, the process disclosed in 1859 by Wurtz and in Encyclopedia of Chemical Technology, Volume 7, pages 257 to 262, published by Interscience Publishers, Inc. (1951), or in U.S. Pat. No. 1,922,459.

Any suitable polyhydric polythioether may be used such as, for example, the condensation product of thiodiglycol or the reaction product of a polyhydric alcohol such as is disclosed above for the preparation of the hydroxyl polyesters with any other suitable thioether glycol. Other suitable polyhydric polythioethers are disclosed in U.S. Pat. No. 2,862,972 and 2,900,368.

Any suitable polyhydric alcohol may be used as the active hydrogen containing compound such as, for example, alkane diols such as, for example, ethylene glycol, 1,3-propylene glycol, 1,2-propylene glycol, 1,4-butylene glycol, 1,3-butylene glycol, 1,5pentanediol, 1,4-butanediol, 1,3-pentanediol, 1,6-hexanediol, 1,7-heptanediol, 2,2-dimethyl-1,3-propanediol, 1,8-octanediol and the like including 1,20-eicosanediol and the like; alkene diols such as, for example, 2-butene-1,4-diol, 2-pentene-1,5-diol, 2-hexene-1,6-diol, 2-heptene-1,7-diol and the like; alkyne diols such as, for example, 2-butyne-1,4-diol, 1,5-hexadiyne-1,6-diol and the like; alkane triols such as, for example, 1,3,6-hexanetriol, 1,3,7-heptane triol, 1,4,8-octane triol, 1,6,12-dodecane triol and the like; alkene triols such as 4-hexene-1,3,6-triol and the like; alkyne triols such as 2-hexyne-1,4,6-triol and the like; alkane tetrols such as, for example, 1,2,5,6-hexane tetrol and the like; alkene tetrols such as, for example, 3-heptene-1,2,6,7-tetrol and the like; alkyne tetrols such as, for example, 4-octyne-1,2,7,8-tetrol and the like.

Any suitable aliphatic thiol including alkane thiols containing two or more -SH groups may be used such as, for example 1,2-ethane dithiol, 1,2-propane dithiol, 1,3-propane dithiol, 1,6-hexane dithiol, 1,3,6-hexane trithiol and the like; alkene thiols such as for example, 2-butene-1,4-dithiol and the like; alkyne thiols such as, for example, 3-hexyne-1,6-dithiol and the like.

Any suitable polyamine may be used including, for example, aromatic polyamines such as, for example, p-amino aniline, 1,5-diamino naphthalene, 2,4diaminotoluene. 1,3,5-benzene triamine, 1,2,3-benzene triamine, 1,4,5,8-naphthalene tetramine and the like; aliphatic polyamines such as, for example, ethylenediamine, 1,3-propylenediamine, 1,4-butylenediamine, 1,3-butylenediamine, diethylenetriamine, triethylene-tetramine, 1,3,6-hexane triamine, 1,3,5,7-heptane tetramine and the like; heterocyclic polyamines such as, for example, 2,6-diamino pyridine, 2,4-diamino-5-aminomethyl pyrimidine, 2,5-diamino-1,3,4-thiadiazole, piperazine and the like.

One especially preferred group of amines useful for preparing polymers are polyamines having the primary amine groups thereof blocked by ketimine or aldimine groups. The reaction of carbonyl compounds with the primary amine groups can be illustrated as follows:

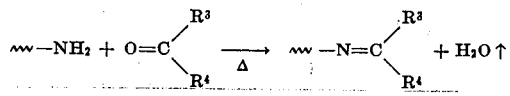

The useful carbonyl compounds may have the following theoretical structural formula

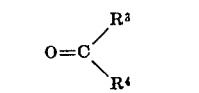

where $R^3$ and $R^4$ are organic radicals, are each substantially inert to the ketimine or aldimine formation reaction and are preferably hydrogen or short chain alkyl groups (one to four carbon atoms). Preferred compounds are low molecular weight ($C_2-C_6$) aldehydes or ketones that are volatile so that an unreacted excess thereof may easily be removed by conventional distillation practices when the reaction is completed. Such volatile compounds are also preferred so that when the blocked polyamine is mixed with the diisocyanate and exposed to moisture, the freed aldehyde or ketone can be easily removed from the reaction mixture. Examples of preferred carbonyl compounds include such aldehydes and ketones as acetone, methyl ethyl ketone, methyl n-butyl ketone, methyl tert-butyl ketone, ethyl isopropyl ketone, acetaldehyde, propionaldehyde, butyraldehyde, isobutyraldehyde, and the like (i.e. including hexanone and hexanal). The polyamines to be blocked preferably have the structure

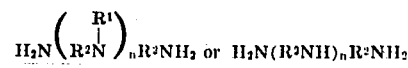

where $R^2$ is a difunctional aliphatic group containing from 2–48 carbon atoms, $R^1$ is an aliphatic group containing 1–24 carbon atoms and $n$ is an integer of from 0–20. Representative $R^1$ radicals are methyl, propyl, butyl, decyl, hexadecyl, hexenyl, octenyl, tridecenyl, octadecyl, undecynyl and the like. Inert or noninterfering groups such as Cl, nitro and the like may be present on $R^1$ and/or $R^2$.

Any suitable reaction product of a phenol with an alkylene oxide yielding a compound containing active hydrogens may be used such as, for example, those disclosed in U.S. Pat. No. 2,843,568, such as for example, the reaction product of hydroquinone with ethylene oxide to give a polyalkylene arylene ether glycol having a molecular weight above about 750 or other polyalkylene arylene ether glycols disclosed in said patent.

Any suitable reaction product of a phenol-aldehyde resin with an alkylene oxide may be used such as, for example, a novolac having the formula

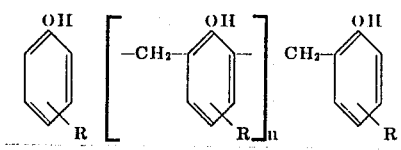

wherein $n$ is 1 to 5 and R is a lower alkyl radical such as methyl, ethyl, propyl, butyl, tertiary butyl and the like reacted with an alkylene oxide such as those disclosed above for the preparation of the polyhydric polyalkylene ethers.

Any suitable reaction product of an amine with an alkylene oxide may be used such as, for example, the reaction product of an alkylene oxide with a tolylenediamine such as, 2,4-tolylenediamine, 2,6-tolylenediamine or the like, a diphenylmethane diamine such as 4,4'-diaminodiphenylmethane or the like, xylylene diamine, as well as alkylene diamines such as, for example, ethylenediamine, propylenediamine, 1,4-butylenediamine, hexamethylenediamine and the like including 1,10-dodecane diamine.

Any suitable phenol may be used such as, for example, 2,2-bis(p-hydroxyphenyl)propane (bisphenol A) and the like.

Any suitable polyamide may be used such as, for example, those obtained by reacting adipic acid with hexamethylene diamine and the like.

Any suitable polyacetal may be used such as, for example, the reaction product of formaldehyde or other suitable aldehydes with a polyhydric alcohol such as those disclosed above for use in the preparation of the hydroxyl polyester.

Other alcohol compounds which do not necessarily fit within any of the previously set forth classes of compounds and which nevertheless contain active hydrogen containing groups which are quite suitable for the production of the polymers are pentaerythritol, sorbitol, triethanolamine, mannitol, N,N,N'N'-tetrakis(2-hydroxypropyl)ethylenediamine, as well as compounds of any of the classes set forth above which are substituted with halogen such as, for example, chloro, iodo, bromo and the like; nitro; alkoxy, such as, for example, methoxy, ethoxy, propoxy, butoxy and the like; carboalkoxy such as for example, carbomethoxy, carboethoxy and the like; dialkyl amino such as, for example, dimethylamino, diethylamino, dipropylamino, methylethylamino and the like; mercapto, carbonyl, thiocarbonyl, phosphoryl, phosphato and the like.

Other substances which can be used include natural substances such as castor oil and the like.

The molar proportions of the diisocyanate and the compounds bearing Zerewitinoff active hydrogen atoms can vary widely. Those skilled in the art can determine the proportions of reactants best suited for a particular purpose. For example, when making polyurethane elastomers, one often uses approximately equimolar amounts of glycol and the diisocyanate. Preferably, the active hydrogen containing compound will be used in a molar ratio to the diisocyanate of 1:10 to 10:1.

The polymers can be prepared by reacting the diisocyanate and the active hydrogen containing compound at subatmospheric, atmospheric or superatmospheric pressure. Atmospheric pressure is preferred. The reaction can be operated over a wide range of temperatures. Those skilled in the art will recognize that there are great differences in the relative reactivity of various groups containing active hydrogen atoms, amines reacting faster than alcohols, primary alcohols reacting faster than tertiary alcohols—to name a few examples; accordingly, one will select a temperature at which the reaction occurs at a rate convenient for the purpose at hand. Preferably, the reaction temperature ranges between about 20° and 150° C. However, the temperature is not critical.

If desired, the reaction may be carried out in an inert solvent. Representative solvents include tetrahydrofuran, o-dichlorobenzene, chlorobenzene, xylene, methyl isobutyl ketone, toluene and ethyl acetate. In general, the solvent should be free from isocyanate-reactable groups such as groups bearing Zerewitinoff-active hydrogen atoms.

In the preparation of the polymers, a portion of the diisocyanates (i.e. up to about 90 mole percent and preferably from 0 to 50 mole percent) can be replaced by known polyisocyanates. Representative of such known polyisocyanates are ethylenediisocyanate, hexamethylenediisocyanate, butylene-1,3-diisocyanate, ethylidene diisocyanate, butylidene diisocyanate, 1,2,4-butanetriisocyanate, 1,3,3-pentanetriisocyanate, p-phenylene-2,2'-bis(ethylisocyanate), 1,4-naphthalene-2,2'-bis(ethylisocyanate, 5-chloro phenylene-1,3-bis(propyl-3-isocyanate), tolylene diisocyanate, m-phenylene diisocyanate, p-phenylene diisocyanate, diphenylene-4,4'-diisocyanate, xylylene-1,4-diisocyanate, 4,4'-diphenylenemethanediisocyanate and the like. A particularly desirable group of polyisocyanates to be employed in combination with the instant diisocyanates in the preparation of the polymers are those described in the application of Rogier and Kamal, Ser. No. 250,211, filed Jan. 9, 1963, now U.S. Pat. No. 3,455,883 entitled "Polyisocyanates and Derivatives." These polyisocyanates are derived from polymeric fat acids and have the following idealized structural formula:

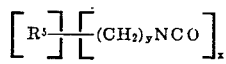

where $y$ is 0 or 1, $x$ is an integer of 2 to about 4 and $R^5$ is the hydrocarbon group of polymeric fat acids. Preferably, $x$ is 2.

The polyisocyanates of the above formula wherein $y$ is 0 are prepared by converting the polymeric fat acids to the corresponding polymeric acid chlorides, reacting the acid chlorides with a metal azide to form the polymeric acyl azides and then heating the acyl azides to produce the polyisocyanates. The polyisocyanates wherein $y$ is 1 are prepared by converting the polymeric fat acids to the corresponding polynitriles and then hydrogenating the polynitriles in the presence of ammonia and a catalyst such as Raney nickel to form polyamines. The polyamines are then reacted with phosgene to give the polyisocanates.

The following examples illustrate the preparation of polymers. The said examples are not to be considered as limiting.

EXAMPLE G

A mixture of 2.00 g. of the carbonate diisocyanate as prepared in Example D and 0.49 g. of the diketimine of diethylene triamine and methylisobutyl ketone was spread on glass with a 3-mil drawdown bar. The film became tack free on the surface in 12 minutes and thoroughly dry in 1 hour at 77° F. and 74 percent relative humidity. The coating was of good appearance.

EXAMPLES H AND I

Coatings are prepared as in example G using the diisocyanates of examples E and F. Similar results are obtained. Where desired, elevated temperatures and/or catalysts such as dibutyl tin dilaurate can be used to accelerate the cure of the polymers.

It is to be understood that changes and variations may be made without departing from the spirit and scope of the invention as defined in the appended claims.

The embodiments of the invention in which an exclusive property or privilege is claimed are defined as follows:

1. A dinitrile having the formula:

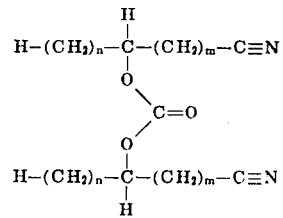

where $n$ is 5 to 20, $m$ is 0 to 15 and the sum of $n$ and $m$ is 14 to 20.

2. The dinitrile of claim 1 wherein the sum of $n$ and $m$ is 16.
3. The dinitrile of claim 1 wherein $n$ is 9.
4. The dinitrile of claim 3 wherein $m$ is 7.
5. The dinitrile of claim 1 wherein $n$ is 7.
6. The dinitrile of claim 1 wherein $n$ is 6.
7. The dinitrile of claim 1 wherein $m$ is 10.
8. The dinitrile of claim 1 wherein $m$ is 8.

* * * * *